United States Patent
Li et al.

(10) Patent No.: US 10,241,188 B2
(45) Date of Patent: Mar. 26, 2019

(54) METHOD AND APPARATUS FOR OBTAINING TIME OF ARRIVAL TOA WHEN MOBILE TERMINAL IS LOCATED

(71) Applicant: HUAWEI TECHNOLOGIES CO., LTD., Shenzhen, Guangdong (CN)

(72) Inventors: Yijie Li, Shenzhen (CN); Jiantao Xue, Beijing (CN); Jie Cui, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/824,105

(22) Filed: Nov. 28, 2017

(65) Prior Publication Data

US 2018/0081024 A1 Mar. 22, 2018

Related U.S. Application Data

(63) Continuation of application No. PCT/CN2015/080285, filed on May 29, 2015.

(51) Int. Cl.
*G01S 5/02* (2010.01)
*G01S 5/06* (2006.01)
(Continued)

(52) U.S. Cl.
CPC .............. *G01S 5/0242* (2013.01); *G01S 5/02* (2013.01); *G01S 5/0294* (2013.01); *G01S 5/06* (2013.01);
(Continued)

(58) Field of Classification Search
CPC ........ G01S 5/0242; G01S 5/02; G01S 5/0294; G01S 5/06; G01S 5/0215; G01S 5/14
(Continued)

(56) References Cited

U.S. PATENT DOCUMENTS 6,493,380 B1 * 12/2002 Wu ........................... G01S 5/02
342/417
6,912,243 B1 * 6/2005 Ishioka ................ H04B 1/7113
370/335
(Continued)

FOREIGN PATENT DOCUMENTS

| CN | 102265570 | 11/2011 |
| CN | 102273081 | 12/2011 |

(Continued)

OTHER PUBLICATIONS

Wu, Shao-Hua et al., TOA *Estimation Based on Match-Filtering Detection for UWB Wireless Sensor Networks*, Journal of Software, vol. 20, No. 11, Nov. 2009, pp. 3010-3022.
(Continued)

*Primary Examiner* — Mong-Thuy T Tran
(74) *Attorney, Agent, or Firm* — Staas & Halsey LLP

(57) ABSTRACT

Embodiments of the present invention disclose a method which including: receiving a locating reference signal sent by a locating transmitter; performing time domain related processing on the locating reference signal and a synchronization reference signal sequence to obtain a related spectrum value of a multipath signal component corresponding to a delay value; detecting a channel parameter used when the locating reference signal is received, and generating, according to the channel parameter and a function that progressively decreases with the delay value, a related spectrum threshold that progressively decreases with the delay value; and traversing the delay value in ascending order of the delay value, searching for a first traversed delay value whose related spectrum value of a multipath signal component corresponding to the delay value is greater than a related spectrum threshold corresponding to the delay
(Continued)

value, and using the found delay value as TOA for outputting.

13 Claims, 7 Drawing Sheets

(51) Int. Cl.
G01S 5/14 (2006.01)
H04W 64/00 (2009.01)

(52) U.S. Cl.
CPC ............ *G01S 5/0215* (2013.01); *G01S 5/14* (2013.01); *H04W 64/006* (2013.01)

(58) Field of Classification Search
USPC ...................................... 455/456.1
See application file for complete search history.

(56) References Cited

U.S. PATENT DOCUMENTS

| | | | | |
|---|---|---|---|---|
| 8,989,772 | B2* | 3/2015 | Krauss | G01S 19/22 455/456.1 |
| 2001/0053699 | A1* | 12/2001 | McCrady | G01S 5/021 455/513 |
| 2006/0025158 | A1* | 2/2006 | Leblanc | G01C 21/206 455/456.2 |
| 2010/0020850 | A1* | 1/2010 | Navarro Rodero | H04B 1/7183 375/130 |
| 2010/0164781 | A1 | 7/2010 | Boyer et al. | |
| 2010/0246564 | A1 | 9/2010 | Vrcelj et al. | |
| 2011/0111751 | A1* | 5/2011 | Markhovsky | G01S 3/74 455/423 |
| 2011/0221635 | A1 | 9/2011 | Wang | |
| 2012/0163515 | A1 | 6/2012 | Kangas et al. | |
| 2013/0120188 | A1 | 5/2013 | Pattabiraman et al. | |
| 2014/0349677 | A1 | 11/2014 | Xiao et al. | |
| 2015/0256972 | A1* | 9/2015 | Markhovsky | H04W 4/90 455/456.1 |

FOREIGN PATENT DOCUMENTS

| | | |
|---|---|---|
| CN | 103238041 | 8/2013 |
| CN | 103297087 | 9/2013 |

OTHER PUBLICATIONS

International Search Report, dated Feb. 29, 2016, in International Application No. PCT/CN2015/080285 (5 pp.).
International Search Report dated Feb. 29, 2016 in corresponding International Patent Application PCT/CN/2015/080285.

* cited by examiner

METHOD AND APPARATUS FOR OBTAINING TIME OF ARRIVAL TOA WHEN MOBILE TERMINAL IS LOCATED

CROSS-REFERENCE TO RELATED APPLICATIONS

This application is a continuation of International Application No. PCT/CN2015/080285, filed on May 29, 2015, the disclosure of which is hereby incorporated by reference in its entirety.

TECHNICAL FIELD

The present disclosure relates to the field of communications technologies, and in particular, to a method and an apparatus for obtaining time of arrival TOA when a mobile terminal is located.

BACKGROUND

With continuous development of mobile communications technologies, a requirement and a service type oriented to a mobile communication service continuously increase. One service is locating a mobile terminal (MT). Locating a mobile terminal MT is extracting, by means of information exchange between the MT and a base station (BS), characteristic information that can be used for locating, so as to estimate an MT location.

There are multiple types of currently popular locating technologies. From a perspective of only a wireless cellular locating technology, there are an advanced global navigation satellite system (A-GNSS) locating technology, an observed time difference of arrival (OTDOA) locating technology, an enhanced cell identification (E-CID) locating method, an uplink-time difference of arrival (UTDOA) locating technology, a radio frequency pattern matching (RFPM) locating technology, and the like. According to a difference in a locating parameter, the locating technology may be divided into an angle of arrival measurement technology (AOA), a time of arrival (TOA) locating technology, a time difference of arrival (TDOA) locating technology, and the like. For example, the OTDOA and the UTDOA locating technologies are derived based on a TDOA technology principle. TDOA is obtained by means of calculation by using TOA as a reference quantity. Therefore, in the wireless cellular locating technology, the TOA is used as a base quantity, and measuring and obtaining the TOA are quite important for developing and applying a locating technology.

In a locating method, TOA estimation is generally obtaining a propagation delay value by detecting a first arrival path (FAP), that is, searching for the first arrival path is a basis for obtaining the TOA. When clocks of a transmitter and of a receiver are synchronized, generally, a commonly used mechanism for detecting a received signal is that the receiver receives a reference signal sent by the transmitter, calculates a time domain related convolution value of the reference signal to obtain a power spectrum that is corresponding to a delay value and that is of the reference signal in a time domain, and searches for a corresponding delay value when power is greater than or equal to a related spectrum threshold for the first time. The delay value is the time of arrival TOA, and a distance between the receiver and the transmitter can be obtained by means of calculation according to the TOA.

However, an inventor finds through research that in a conventional technology, in a TOA-based locating method, a method for obtaining TOA by searching for a first arrival path FAP has at least the following problem: In the conventional technology, the foregoing related spectrum threshold is a constant value, that is, is not changed without reason after being set. This manner is suitable only for an environment with a relatively good channel environment. When the channel environment is relatively poor and interference is relatively strong, a probability of incorrectly determining a first arrival path increases due to noise interference. Therefore, in the conventional technology, a channel environment adaptability of a manner of obtaining TOA by searching for a first arrival path FAP based on a constant threshold is relatively poor, thereby decreasing ranging accuracy.

SUMMARY

Based on this, to resolve a technical problem in the conventional technology that ranging accuracy is relatively low because a channel environment adaptability of a manner of obtaining TOA by searching for a first arrival path FAP based on a constant threshold is relatively poor, a method for obtaining time of arrival TOA when a mobile terminal is located is provided.

A first aspect of the present invention provides a method for obtaining time of arrival TOA when a mobile terminal is located, where the method includes:
receiving a locating reference signal sent by a locating transmitter;
performing time domain related processing on the locating reference signal and a synchronization reference signal sequence to obtain a related spectrum value of a multipath signal component corresponding to a delay value;
detecting a channel parameter used when the locating reference signal is received, and generating, according to the channel parameter and a function that progressively decreases with the delay value, a related spectrum threshold that progressively decreases with the delay value; and
traversing the delay value in ascending order of the delay value, searching for a first traversed delay value whose related spectrum value of a multipath signal component corresponding to the delay value is greater than a related spectrum threshold corresponding to the delay value, and using the found delay value as TOA for outputting.

In a first possible implementation of the first aspect, the channel parameter includes a signal-to-noise ratio SNR; and
the generating, according to the channel parameter and a function that progressively decreases with the delay value, a related spectrum threshold that progressively decreases with the delay value includes:
setting, according to the signal-to-noise ratio SNR, a correction parameter value of an exponential function that progressively decreases with the delay value, and generating, according to the exponential function that progressively decreases with the delay value and whose correction parameter value is set, the related spectrum threshold that progressively decreases with the delay value.

In a second possible implementation of the first aspect, the setting, according to the signal-to-noise ratio SNR, a correction parameter value of an exponential function that progressively decreases with the delay value includes:
obtaining a preset SNR threshold range;
searching for an SNR threshold range to which the detected signal-to-noise ratio SNR belongs; and
obtaining a correction parameter value corresponding to the found SNR threshold range, and setting the correction parameter value corresponding to the found SNR threshold range to the correction parameter value of the exponential function that progressively decreases with the delay value.

With reference to the first aspect and the second possible implementation of the first aspect, in a third possible implementation, the generating, according to the exponential function that progressively decreases with the delay value and whose correction parameter value is set, the related spectrum threshold that progressively decreases with the delay value is:

according to a formula:

$$\text{ThresholdValue}(t) = S_1(\text{SNR})aN_0 e^{-b(t-t_{ref})} + S_2(\text{SNR})$$

$$P(Z_n \geq aN_0) = \delta$$

generating the related spectrum threshold ThresholdValue (t) that progressively decreases with the delay value, where a variable t is the delay value, $t_{ref}$ is a reference delay, $S_1(\text{SNR})$ is a first correction parameter value corresponding to the SNR threshold range to which the detected signal-to-noise ratio SNR belongs, $S_2(\text{SNR})$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal, $P(Z_n \geq aN_0)$ is a probability that the signal strength of the received locating reference signal is greater than or equal to $aN_0$ when the delay value is t, $\delta$ is a probability threshold, and a is a solution of $P(Z_n \geq aN_0) = \delta$.

With reference to any one of the first aspect or the first to the third possible implementations of the first aspect, in a fourth possible implementation, the channel parameter includes the signal-to-noise ratio SNR or a signal to interference plus noise ratio SINR; and the using the found delay value as TOA includes:

when the SNR or the SINR is greater than or equal to a preset channel indicator threshold, caching the found delay value to be used as a historical premium delay value, and using the found delay value as the TOA.

With reference to the first aspect and the fourth possible implementation of the first aspect, in a fifth possible implementation, the using the found delay value as TOA includes:

when the SNR or the SINR is less than the preset channel indicator threshold, generating a weight coefficient according to the detected SNR or SINR; and obtaining the cached historical premium delay value, performing weighted averaging on the historical premium delay value and the found delay value according to the weight coefficient to obtain a correction delay value, and using the correction delay value as the TOA.

In addition, to resolve a technical problem in the conventional technology that ranging accuracy is relatively low because a channel environment adaptability of a manner of obtaining TOA by searching for a first arrival path FAP based on a constant threshold is relatively poor, an apparatus for obtaining time of arrival TOA when a mobile terminal is located is provided.

A second aspect of the present invention provides an apparatus for obtaining time of arrival TOA when a mobile terminal is located, including:

a locating reference signal receiving module, configured to receive a locating reference signal sent by a locating transmitter;

a time domain related processing signal generation module, configured to perform time domain related processing on the locating reference signal received by the locating reference signal receiving module and a synchronization reference signal sequence to obtain a related spectrum value of a multipath signal component corresponding to a delay value;

a variable threshold signal generation module, configured to detect a channel parameter used when the locating reference signal is received, and generate, according to the channel parameter and a function that progressively decreases with the delay value, a related spectrum threshold that progressively decreases with the delay value; and a TOA searching module, configured to: receive the related spectrum value that is corresponding to the delay value and that is generated by the time domain related processing signal generation module and the related spectrum threshold that is corresponding to the delay value and that is generated by the variable threshold signal generation module, traverse the delay value in ascending order of the delay value, search for a first traversed delay value whose related spectrum value of a multipath signal component corresponding to the delay value is greater than a related spectrum threshold corresponding to the delay value, and use the found delay value as TOA for outputting.

In a first possible implementation of the second aspect, the channel parameter includes a signal-to-noise ratio SNR; and the variable threshold signal generation module is further configured to: set, according to the signal-to-noise ratio SNR, a correction parameter value of an exponential function that progressively decreases with the delay value, and generate, according to the exponential function that progressively decreases with the delay value and whose correction parameter value is set, the related spectrum threshold that progressively decreases with the delay value.

In a second possible implementation of the second aspect, the variable threshold signal generation module is further configured to: obtain a preset SNR threshold range; search for an SNR threshold range to which the detected signal-to-noise ratio SNR belongs; and obtain a correction parameter value corresponding to the found SNR threshold range, and set the correction parameter value corresponding to the found SNR threshold range to the correction parameter value of the exponential function that progressively decreases with the delay value.

With reference to the second aspect and the second possible implementation of the second aspect, in a third possible implementation, the variable threshold signal generation module is further configured to: according to a formula:

$$\text{ThresholdValue}(t) = S_1(\text{SNR})aN_0 e^{-b(t-t_{ref})} + S_2(\text{SNR})$$

$$P(Z_n \geq aN_0) = \delta$$

generate the related spectrum threshold ThresholdValue(t) that progressively decreases with the delay value, where a variable t is the delay value, $t_{ref}$ is a reference delay, $S_1(\text{SNR})$ is a first correction parameter value corresponding to the SNR threshold range to which the detected signal-to-noise ratio SNR belongs, $S_2(\text{SNR})$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal, $P(Z_n \geq aN_0)$ is a probability that the signal strength of the received locating reference signal is greater than or equal to $aN_0$ when the delay value is t, $\delta$ is a probability threshold, and a is a solution of $P(Z_n \geq aN_0) = \delta$.

With reference to any one of the second aspect or the first to the third possible implementations of the first aspect, in a fourth possible implementation, the channel parameter includes the signal-to-noise ratio SNR or a signal to interference plus noise ratio SINR; and the TOA searching module is configured to: when the SNR or the SINR is greater than or equal to a preset channel indicator threshold, cache the found delay value to be used as a historical premium delay value, and use the found delay value as the TOA.

With reference to the second aspect and the fourth possible implementation of the first aspect, in a fifth possible implementation, the TOA searching module is configured to: when the SNR or the SINR is less than the preset channel indicator threshold, generate a weight coefficient according to the detected SNR or SINR; and obtain the cached historical premium delay value, perform weighted averaging on the historical premium delay value and the found delay value according to the weight coefficient to obtain a correction delay value, and use the correction delay value as the TOA.

In addition, to resolve a technical problem in the conventional technology that ranging accuracy is relatively low because a channel environment adaptability of a manner of obtaining TOA by searching for a first arrival path FAP based on a constant threshold is relatively poor, a device for measuring time of arrival TOA is further provided.

A third aspect of the present invention provides a device for measuring time of arrival TOA, where the device for measuring time of arrival TOA includes a wireless transceiver apparatus, a memory, and a processor, the memory stores a group of programs, and the processor is configured to invoke the programs stored in the memory to perform the following operations:

receiving a locating reference signal sent by a locating transmitter;

performing time domain related processing on the locating reference signal and a synchronization reference signal sequence to obtain a related spectrum value of a multipath signal component corresponding to a delay value;

detecting a channel parameter used when the locating reference signal is received, and generating, according to the channel parameter and a function that progressively decreases with the delay value, a related spectrum threshold that progressively decreases with the delay value; and traversing the delay value in ascending order of the delay value, searching for a first traversed delay value whose related spectrum value of a multipath signal component corresponding to the delay value is greater than a related spectrum threshold corresponding to the delay value, and using the found delay value as TOA for outputting.

Implementation of the embodiments of the present invention brings the following beneficial effects:

According to the method and the apparatus for obtaining TOA when a mobile terminal is located, related spectrum values of multiple multipath signal components corresponding to delay values are obtained by performing time domain related processing on a locating reference signal and a synchronization reference signal sequence, a related spectrum threshold that progressively decreases with the delay value is generated according to a channel parameter used when the locating reference signal is received and by using a function that progressively decreases with the delay value, and time of arrival TOA is generated for outputting by comparing the related spectrum value of the multipath signal component and the related spectrum threshold. Compared with a manner of using an energy spectrum value in a conventional technology, for the related spectrum value obtained by means of time domain related processing, a gain is larger. Therefore, a difference between a multipath signal and noise is relatively big, and an error generated when the related spectrum value of the multipath signal component is compared with the related spectrum threshold is relatively minor. In addition, the related spectrum threshold that progressively decreases with the delay value and that is generated according to the channel parameter and by using the function that progressively decreases with the delay value enables a related spectrum threshold corresponding to a relatively small delay value to be relatively large when an SNR is relatively small, so that impact generated by partial noise is filtered out. Therefore, the method and the apparatus for obtaining TOA when a mobile terminal is located can adapt to an environment in which the SNR is relatively small, so that ranging accuracy is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
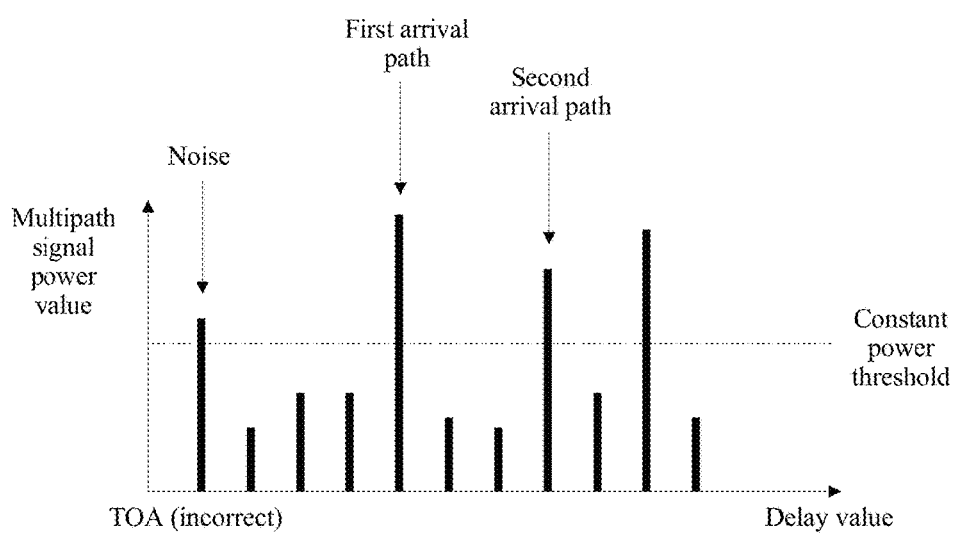
FIG. 1 is a schematic diagram of searching for TOA corresponding to a first arrival path according to a constant related spectrum threshold in a conventional technology.
Figure 2:
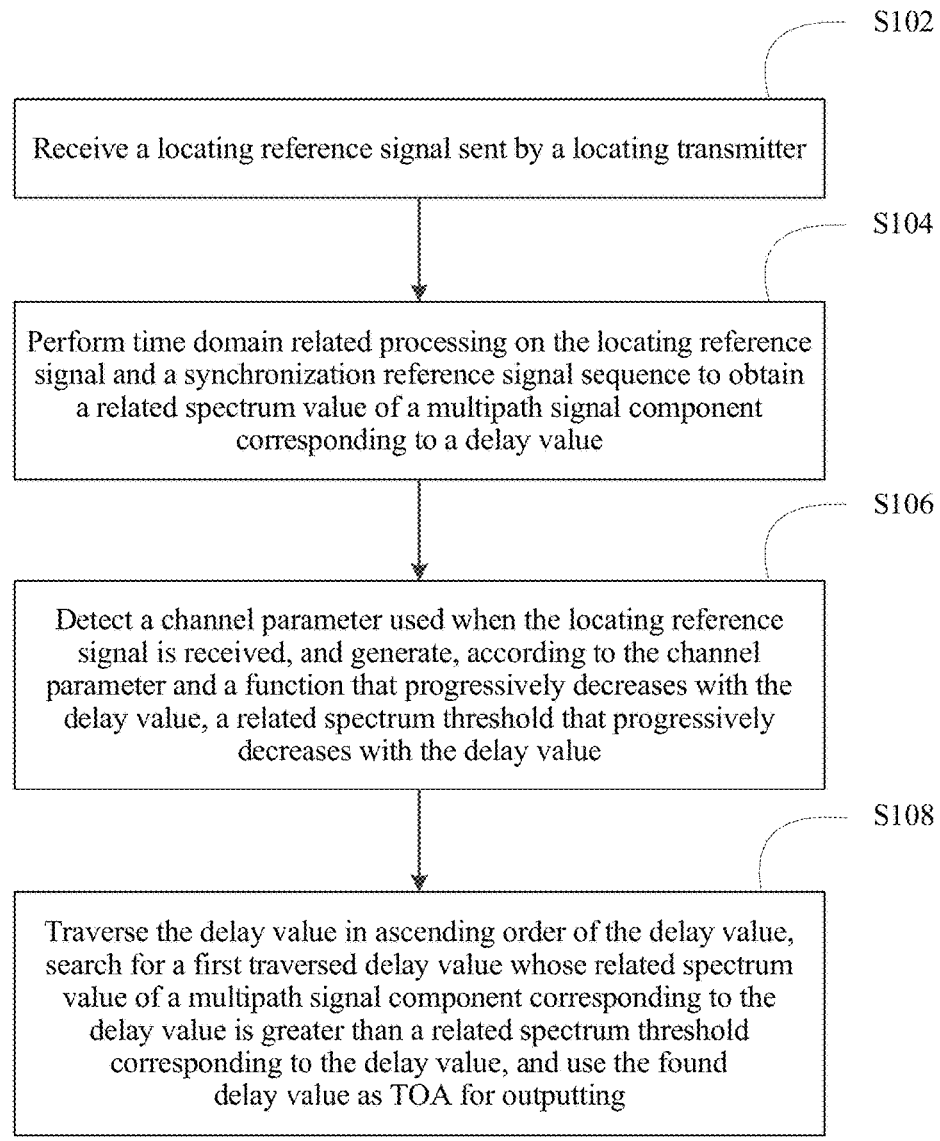
FIG. 2 is a flowchart of a method for obtaining TOA when a mobile terminal is located according to an embodiment of the present invention.

In a conventional technology, time domain related processing is performed on a locating reference signal received by a locating receiver and a synchronization reference signal sequence on the locating receiver to obtain a multipath signal component power value corresponding to a delay value. When a channel environment is poor and a signal-to-noise ratio SNR is relatively low, an interference noise power value is relatively high. As shown in FIG. 1, if a constant related spectrum threshold is used, it is much possible that a noise component with a relatively small delay value is used as a first arrival path FAP, and therefore finally outputted time of arrival TOA is relatively small, and ranging accuracy is relatively low.

To resolve a technical problem in the conventional technology that the ranging accuracy decreases because a channel environment adaptability of a manner of obtaining TOA by searching for a first arrival path FAP based on a constant threshold is relatively poor, in an embodiment, a method for obtaining TOA when a mobile terminal is located is provided. Execution of the method may rely on a signal processing circuit or a signal processing chip with a time domain related processing function and a function calculation function.

Specifically, as shown in FIG. 1, the method for obtaining TOA when a mobile terminal is located includes the following steps.

Step S102: Receive a locating reference signal sent by a locating transmitter.

In this embodiment, the method runs on a locating receiver, and the locating transmitter is used by the locating receiver as a communications apparatus of a ranging mark. For example, if a mobile terminal MT actively measures a distance between the mobile terminal MT and a base station BS that is selected as a ranging mark, the mobile terminal MT is the locating receiver, and the base station BS that is selected as the ranging mark is the locating transmitter. If a base station BS actively measures a distance between the base station BS and a mobile terminal MT, the base station BS is the locating receiver, and the mobile terminal MT that is selected as a ranging mark is the locating transmitter.

The locating reference signal is a signal sent by the locating transmitter in a telecommunications network for a measuring or monitoring purpose. The mobile terminal MT and the base station BS store same synchronization reference signal sequences to keep synchronization. The mobile terminal MT or the base station BS may send the respective stored synchronization reference signal sequences to each other by using the locating reference signal.

For example, if the locating receiver is the mobile terminal MT, and the locating transmitter used as the ranging mark is the base station BS, the locating reference signal received by the mobile terminal MT may be a cell-specific reference signal (CRS) delivered by the base station. If the locating receiver is the base station BS, and the locating transmitter used as the ranging mark is the mobile terminal MT, the locating reference signal received by the mobile terminal MT may be a sounding reference signal (SRS) uploaded by the mobile terminal MT.

It should be noted that because a process of executing this method by using the mobile terminal MT as the locating receiver and using the base station BS as the locating receiver is unrelated to a type of the locating reference signal, in subsequent embodiments, an example in which only the mobile terminal MT is used as the locating receiver to receive the CRS signal delivered by the base station BS, where the base station BS is used as the ranging mark and the CRS signal is used as the locating reference signal, is used for description. A case in which the base station BS is used as the locating receiver to receive the SRS signal uploaded by the mobile terminal MT, where the mobile terminal MT is used as the ranging mark and the SRS signal is used as the locating reference signal, is not described in detail.

Step S104: Perform time domain related processing on the locating reference signal and a synchronization reference signal sequence to obtain a related spectrum value of a multipath signal component corresponding to a delay value.

Because there exists a distance difference between the locating receiver and the locating transmitter, there exists a delay effect when the locating reference signal is transmitted to the locating receiver. In addition, because the locating reference signal transmitted by the locating transmitter may undergo an effect such as reflection or diffraction in a transmission process, the locating reference signal may reach the locating receiver through multiple paths, and the locating reference signal received by the locating receiver has a multipath characteristic. By performing time domain related processing on the locating reference signal and the synchronization reference signal sequence on the locating receiver, and by calculating a correlation between the locating reference signal and the synchronization reference signal sequence on a time domain, related spectrum values corresponding to multipath signal components that are corresponding to different delay values in the locating reference signal may be determined.

Figure 3:
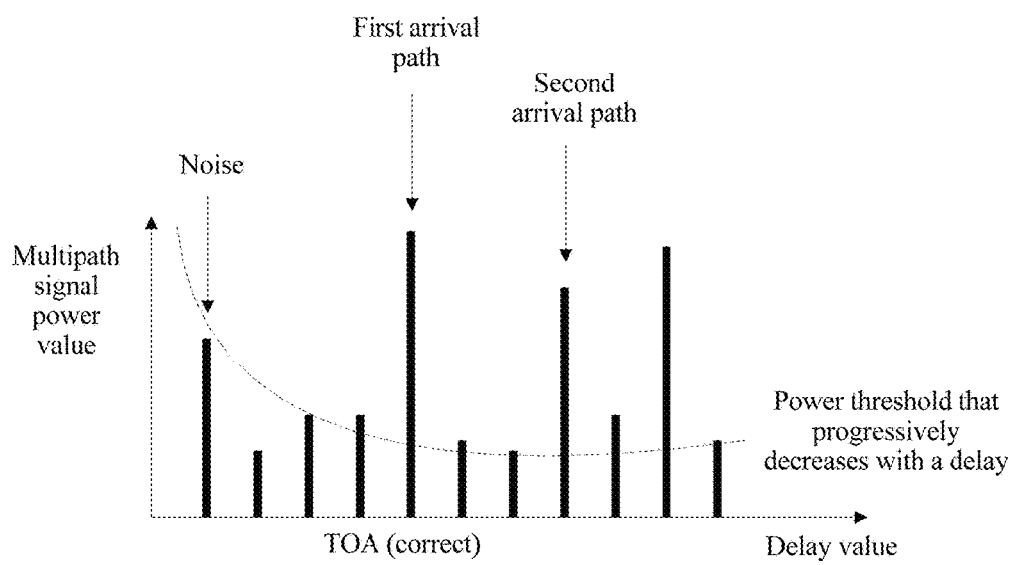
FIG. 3 is a schematic diagram of searching for, according to a related spectrum threshold that progressively decreases with a delay, TOA corresponding to a first arrival path according to an embodiment of the present invention.

For example, after the mobile terminal MT receives the CRS signal delivered by the base station BS that is used as the ranging mark, time domain related processing may be performed on the received CRS signal and a CRS sequence that is used as a synchronization reference signal sequence and that is on the mobile terminal MT, and distribution of a related spectrum value of a multipath signal component that changes with the delay value may be obtained. A schematic diagram of the distribution of the related spectrum value of the multipath signal component may be shown in FIG. 3. In FIG. 3, if a related spectrum value of a multipath signal component corresponding to a delay value is relatively large, it indicates that the multipath signal component reaches the locating receiver after the delay value elapses, that is, the locating reference signal transmitted by the locating transmitter selects a path to be transmitted to the locating receiver in the transmission process. A distance length of the path leads to a delay value corresponding to a power spectrum image in FIG. 3 when the locating reference signal transmitted by the path is transmitted to the locating receiver. It should be understood that the time domain related processing in the present invention may be performing time domain convolution on the locating reference signal and the synchronization reference signal sequence, or may be obtaining the multipath signal component power value corresponding to the delay value in a time domain calculation manner that is performed in another manner.

Step S106: Detect a channel parameter used when the locating reference signal is received, and generate, according to the channel parameter and a function that progressively decreases with the delay value, a related spectrum threshold that progressively decreases with the delay value.

In this embodiment, the related spectrum threshold is a value that changes with the delay value, but is not a constant value. When a channel environment is poor, noise interference is relatively strong. Therefore, in the related spectrum value that is of the multipath signal component corresponding to the delay value and that is obtained in step S104, when the delay value is relatively small, a multipath signal component with a relatively large related spectrum value still exists. Therefore, the related spectrum threshold may be generated by using the function that progressively decreases with the delay value, and a parameter in the function that progressively decreases with the delay value is adjusted by using a channel parameter detected in real time, so as to filter out a noise vector used when the delay value is relatively small, thereby eliminating the noise interference.

In this embodiment, the channel parameter may include a signal-to-noise ratio SNR, a signal to interference plus noise ratio SINR, a channel environment parameter, or the like. The channel environment parameter may include a type such as additive white Gaussian noise (AWGN), ETU, or EPA. Optionally, for the function that progressively decreases with the delay value, an exponential function that uses the delay value as an independent variable and that progressively decreases with the delay value may be selected, and the generating, according to the channel parameter and a function that progressively decreases with the delay value, a related spectrum threshold that progressively decreases with the delay value may include:

setting, according to the signal-to-noise ratio SNR, a correction parameter value of the exponential function that progressively decreases with the delay value, and generating, according to the exponential function that progressively decreases with the delay value and whose correction parameter value is set, the related spectrum threshold that progressively decreases with the delay value.

Figure 4:
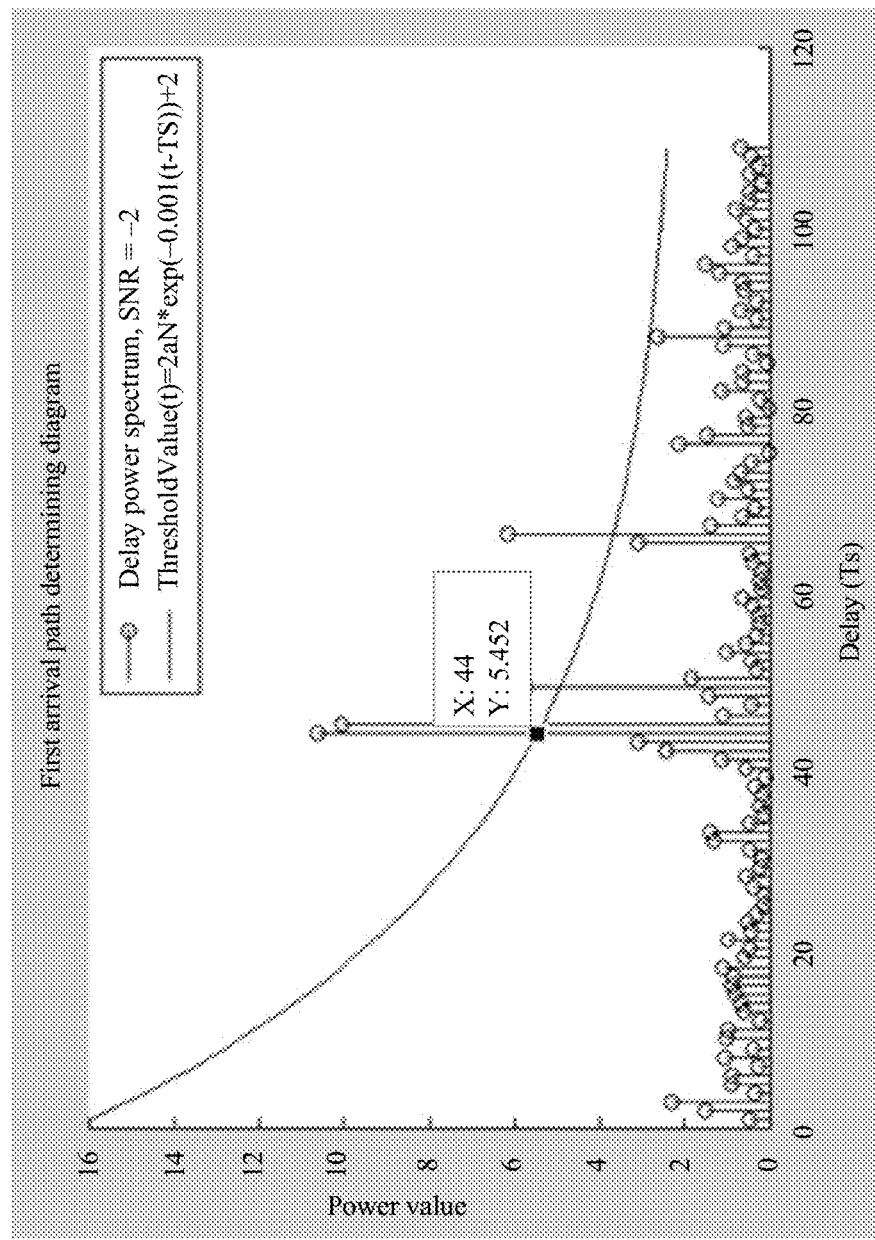
FIG. 4 is a power spectrum diagram when an SNR of a locating reference signal is −2 in an application scenario of the present invention.

As shown in FIG. 4, generating the related spectrum threshold by using the exponential function that progressively decreases with the delay value may reference an expression of an exponential function whose base is e:

$$\text{ThresholdValue}(t) = k e^{-b(t - t_{ref})} + c$$

where ThresholdValue(t) is the related spectrum threshold, and $t_{ref}$, k, b, and c are parameter values of the exponential function and may be set according to an actual situation. Because a characteristic that a decreasing rate of the exponential function gradually slows down, a relatively high related spectrum threshold may be set for strong noise used when the delay value is relatively small, and a decreasing speed of the related spectrum threshold is gradually slowed down when the delay value progressively increases. In this way, the generated related spectrum threshold may sharply decrease when the delay value is relatively small. The decreasing speed of the related spectrum threshold is gradually slowed down when the delay value is relatively small, the noise interference when the delay value is small may be filtered out, and a component of a locating reference signal that reaches through a shortest distance (that is, reaches through a first arrival path FAP) is prevented from being ignored because the related spectrum threshold is excessively high.

Figure 5:
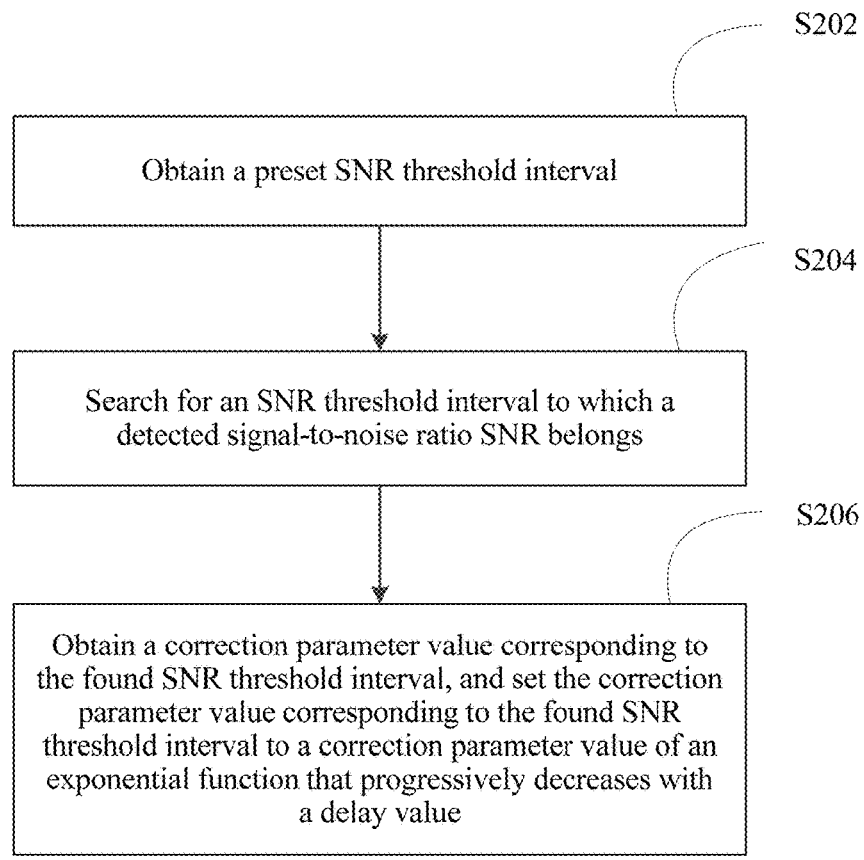
FIG. 5 is a flowchart of a process of adjusting, according to a channel parameter, a parameter of a function that progressively decreases with a delay according to an embodiment of the present invention.

Optionally, the exponential function that progressively decreases with the delay value may be corrected according to the signal-to-noise ratio SNR. Specifically, as shown in FIG. 5, the setting, according to the signal-to-noise ratio SNR, a correction parameter value of the exponential function that progressively decreases with the delay value may include the following steps:

Step S202: Obtain a preset SNR threshold range.

Step S204: Search for an SNR threshold range to which the detected signal-to-noise ratio SNR belongs.

Step S206: Obtain a correction parameter value corresponding to the found SNR threshold range, and set the correction parameter value corresponding to the found SNR threshold range to the correction parameter value of the exponential function that progressively decreases with the delay value.

The signal-to-noise ratio SNR reflects a noise interference degree of a current channel when the locating reference signal is received. When the signal-to-noise ratio SNR is relatively high, the related spectrum threshold when the delay value is relatively small may be decreased by setting a parameter of the exponential function that progressively decreases with the delay value, thereby preventing a signal component of the locating reference signal that reaches the locating receiver through the first arrival path FAP from being ignored because the related spectrum threshold is excessively high. When the signal-to-noise ratio SNR is relatively low, the related spectrum threshold when the delay value is relatively small may be increased by setting the parameter of the exponential function that progressively decreases with the delay value, thereby preventing noise from being incorrectly determined as the signal component of the locating reference signal that reaches the locating receiver through the first arrival path FAP, and further improving accuracy of obtaining TOA.

Specifically, in this embodiment, the generating, according to the exponential function that progressively decreases with the delay value and whose correction parameter value is set, the related spectrum threshold that progressively decreases with the delay value may be specifically:

according to a formula:

$$\text{ThresholdValue}(t) = S_1(\text{SNR}) a N_0 e^{-b(t - t_{ref})} + S_2(\text{SNR})$$

$$P(Z_n \geq a N_0) = \delta$$

generating the related spectrum threshold ThresholdValue(t) that progressively decreases with the delay value, where a variable t is the delay value, $t_{ref}$ is a reference delay, $S_1(\text{SNR})$ is a first correction parameter value corresponding to the SNR threshold range to which the detected signal-to-noise ratio SNR belongs, $S_2(\text{SNR})$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal, $P(Z_n \geq a N_0)$ is a probability that the signal strength of the received locating reference signal is greater than or equal to $a N_0$ when the delay value is t, $\delta$ is a probability threshold (which may be preferably $1 \times 10^{-9}$), and a is a solution of $P(Z_n \geq a N_0) = \delta$.

Optionally, the adjustment coefficient b may be a preset parameter value corresponding to the channel environment parameter. As described above, the channel environment parameter may include the type such as the AWGN, the ETU, or the EPA, and the corresponding adjustment coefficient b may be set according to the channel environment parameter, so that the obtained related spectrum threshold may adapt to multiple channel environments, and ranging accuracy is improved.

Step S108: Traverse the delay value in ascending order of the delay value, search for a first traversed delay value whose related spectrum value of a multipath signal component corresponding to the delay value is greater than a related spectrum threshold corresponding to the delay value, and use the found delay value as time of arrival TOA for outputting.

As shown in FIG. 4, after the related spectrum value of the multipath signal component that distributes according to the delay value and the related spectrum threshold that progressively decreases with the delay value are obtained, traversing may be performed when the delay value progressively increases. The related spectrum value of the multipath signal component corresponding to the traversed delay value is compared with the related spectrum threshold corresponding to the traversed delay value, that is, the related spectrum value of the multipath signal component and the related spectrum threshold at any moment are compared as time goes by. If at a moment, the related spectrum value of the multipath signal component is greater than the related spectrum threshold at first determining, a delay value corresponding to the moment is the delay value when the locating reference signal reaches the locating receiver through the first arrival path FAP. Because a straight line between two points is shortest, the signal component of the locating reference signal that reaches the locating receiver through the first arrival path FAP is a signal component for transmitting the locating reference signal from the locating transmitter to the locating receiver through a straight line, and the delay value is TOA of the locating reference signal.

It should be noted that step S104 and step S106 need to be performed at the same time. That is, at the same time of gradually obtaining the related spectrum value of the multipath signal component by means of time domain related processing when the delay value increases, the related spectrum threshold at the moment is also obtained by means of calculation by using the function that progressively decreases with the delay value. By inputting the related spectrum value of the multipath signal component and the related spectrum threshold at the moment into a comparison circuit, the first traversed delay value whose related spectrum value of the multipath signal component corresponding to the delay value is greater than the related spectrum threshold corresponding to the delay value may be searched for.

For example, step S104 may be performed by using a chip or a processor including a time domain related processing function, to obtain a first signal of the related spectrum value of the multipath signal component that changes when the delay value increases. In addition, step S106 may be performed by using a chip or a processor including a function calculation function (which may be a same processor as the chip or the processor including the time domain related processing function), to obtain a second signal of the related spectrum threshold that changes when the delay value increases. The first signal and the second signal may be sampled and detected. A sampling time point is the traversed delay value. If at a sampling time point, the detected first signal is greater than or equal to the second signal, a delay value at the sampling time point is the found first traversed delay value whose related spectrum value of the multipath signal component corresponding to the delay value is greater than the related spectrum threshold corresponding to the delay value.

An actual application scenario is used as an example. If in the application scenario, the detected channel environment parameter is the ETU type, the adjustment parameter b may be set according to the ETU type. If the preset SNR threshold range includes three intervals that are successively $(-\infty, -4]$, $(-4, 4)$, and $[4, \infty)$, and the first correction parameter value and the second correction parameter value corresponding to each SNR threshold range are successively 3 and 4 (corresponding to the SNR threshold range $(-\infty, -4]$), 2 and 2 (corresponding to the SNR threshold range $(-4, 4)$), and 2 and 0 (corresponding to the SNR threshold range $[4, \infty)$), a function for generating the related spectrum threshold may be:

$$ThresholdValue(t) = \begin{cases} 3aN_0 e^{-b(t-t_{ref})} + 4, & SNR \geq 4 \\ 2aN_0 e^{-b(t-t_{ref})} + 2, & SNR \in (-4, 4) \\ 2aN_0 e^{-b(t-t_{ref})}, & SNR \leq -4 \end{cases}$$

If at a moment, the detected signal-to-noise ratio SNR is $-2$, an SNR threshold range corresponding to SNR=$-2$ is $(-4, 4)$, a corresponding first correction parameter value is 2, and a second correction parameter value is 2. In the end, the function for generating the related spectrum threshold in the signal-to-noise ratio environment is:

$$ThresholdValue(t) = 2aN_0 e^{-b(t-t_{ref})} + 2,$$

where $t_{ref}$ may be set to 1 Ts, b may be set to 0.001, and a finally obtained related spectrum threshold that progressively decreases with the delay value is:

$$ThresholdValue(t) = 2aN_0 e^{-0.001(t-t_{ref})} + 2,$$

Figure 6:
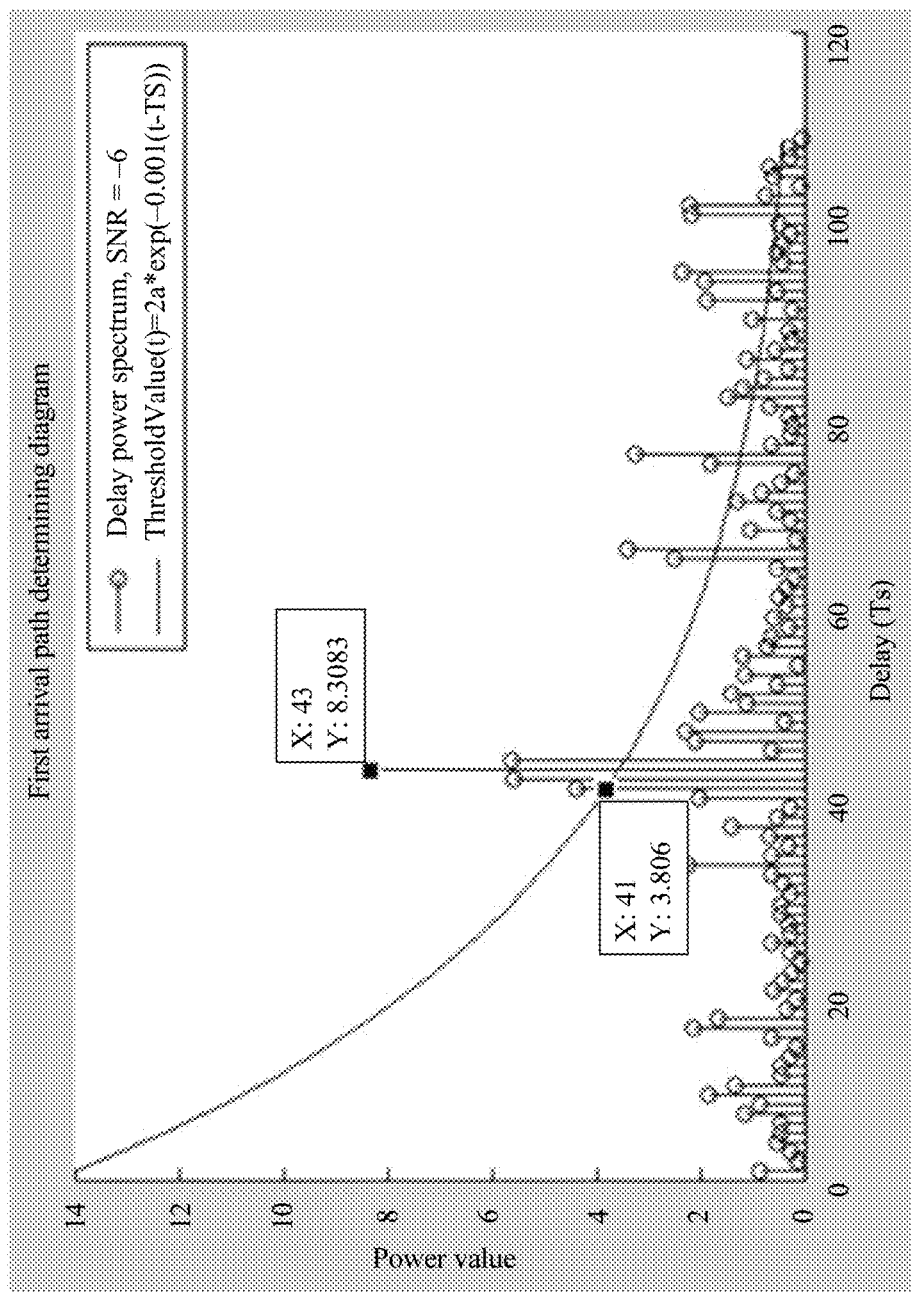
FIG. 6 is a power spectrum diagram when an SNR of a locating reference signal is −6 in an application scenario of the present invention.

A schematic diagram of distribution of the related spectrum value of the multipath signal component in the application scenario is shown in FIG. 6. A delay t=44 Ts, where the delay is corresponding to the signal component of the locating reference signal that reaches through the first arrival path FAP, and 44 Ts may be used as the TOA for outputting.

Optionally, when the found delay value is used as the TOA for outputting, it may be determined, according to a channel parameter of the current channel, whether the found delay value is suitable for being used as the TOA for outputting. Specifically, it may be determined whether the SNR or the SINR is greater than or equal to a preset channel indicator threshold. If the SNR or the SINR is greater than or equal to the preset channel indicator threshold, it indicates that the channel environment is good, and the found delay value is suitable for being used as the TOA for outputting. In this case, the delay value that is used as the TOA for outputting may be used as a historical premium delay value to be cached. If the SNR or the SINR is less than the preset channel indicator threshold, it indicates that the found delay value is obtained when the channel environment is relatively poor. Though a relatively proper related spectrum threshold is selected in the foregoing manner, a probability of incorrect determining still exists. In this case, a weight coefficient is generated according to the detected SNR or SINR, the cached historical premium delay value is obtained, weighted averaging is performed on the historical premium delay value and the found delay value according to the weight coefficient to obtain a correction delay value, and the correction delay value is used as the TOA.

This is reflected in a formula:

$$\begin{cases} TOA_1 = t_1, & SNR \geq c \\ TOA_2 = \alpha(SNR) \cdot t_1 + (1-\alpha) \cdot t_2, & \alpha(SNR) \in [0, 1], SNR < c \end{cases}$$

For example, if a user who uses the mobile terminal MT inputs an instruction for starting ranging, the mobile terminal MT starts to be used as the locating receiver to receive the CRS signal delivered by the base station BS that is used as the ranging mark. If a found delay value obtained when step S102 to step S108 are performed for the first time is $t_1$, and it is detected, in a process of searching for and obtaining $t_1$, that the SNR is greater than the channel indicator threshold c, it indicates that noise interference to this ranging is relatively weak, and $t_1$ may be used as the TOA for outputting. If the user re-inputs the instruction for starting ranging, the mobile terminal MT is used as the locating receiver to receive the CRS signal delivered by the base station BS that is used as the ranging mark, a found delay value obtained by performing step S102 to step S108 is $t_2$, and the detected SNR decreases to below the channel indicator threshold c because strong interference occurs in an area in which the mobile terminal MT is located, $t_2$ is not used as the TOA for outputting. Instead, a weight coefficient α is generated according to the detected SNR, $t_1$ that is used as the historical premium delay value needs to be considered as a reference, $t_1$ is multiplied by the weight coefficient α, $t_2$ is multiplied by a weight coefficient 1−α, and then addition is performed. A delay value obtained by means of addition calculation is used as the TOA for outputting.

TOA outputted in this manner references TOA previously outputted when the SNR is relatively high, an error of a delay value obtained in an environment in which the SNR is relatively low may be reduced, and the ranging accuracy is improved.

Further, after the user inputs the instruction for starting ranging into the mobile terminal MT, the mobile terminal MT may repeatedly perform step S102 to step S108 for multiple times (such as 100 times), set, according to an SNR detected at each execution, a weight coefficient of a delay value obtained at each searching, perform weighted averaging according to the delay value and the corresponding weight coefficient obtained at each searching, and use an average value as the TOA for outputting. TOA generated in this manner is obtained through multiple times of measurement, an error generated at each measurement may be reduced by calculating the average value, and the ranging accuracy is improved.

For example, a former application scenario is further used as an example. In the application scenario, if at a moment, the detected signal-to-noise ratio SNR is −6, an SNR threshold range corresponding to SNR=−6 is (−∞, −4), a corresponding first correction parameter value is 2, and a second correction parameter value is 0. In the end, the function for generating the related spectrum threshold in the signal-to-noise ratio environment is:

$$\text{ThresholdValue}(t) = 2aN_0 e^{-0.001(t-t_{ref})}$$

where $t_{ref}$ may be set to 1 Ts. A schematic diagram of distribution of the related spectrum value of the multipath signal component in the application scenario is shown in FIG. 6. A delay t=41 Ts, where the delay is corresponding to the signal component of the locating reference signal that reaches through the first arrival path FAP.

If the signal indicator threshold c is −4, because SNR<c, a weight coefficient α needs to be generated according to the SNR.

In the application scenario, the weight coefficient α may be set according to the following formula:

$$\alpha(SNR) = \begin{cases} 0, & SNR \geq 3 \\ -\frac{1}{13} \cdot SNR + \frac{3}{13}, & SNR \in (-10, 3) \\ 1, & SNR \leq -10 \end{cases}$$

Therefore, α(−6) is obtained by means of calculation and is 9/13. Because in previous measurement, the SNR is −2 and is greater than the signal indicator threshold c, the delay value 44 Ts that is used as the TOA for outputting is the historical premium delay value.

According to a formula:

$$\frac{9}{13} \cdot 44 + \left(1 - \frac{9}{13}\right) \cdot 41 = \frac{560}{13} \approx 43 Ts,$$

TOA outputted in this measurement is 43 Ts.

Figure 7:
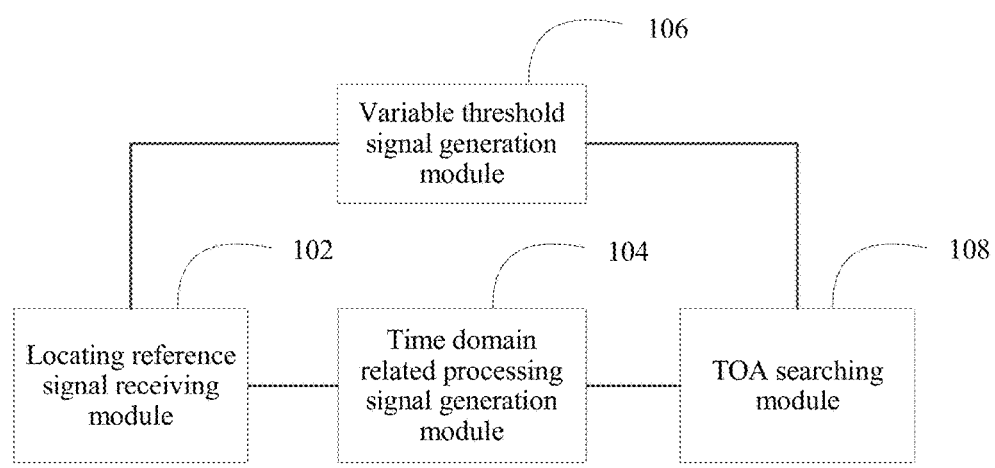
FIG. 7 is a schematic diagram of an apparatus for obtaining TOA when a mobile terminal is located according to an embodiment of the present invention.

To resolve a technical problem in the conventional technology that the ranging accuracy decreases because a channel environment adaptability of a manner of obtaining TOA by searching for a first arrival path FAP based on a constant threshold is relatively poor, in an embodiment, an apparatus for obtaining TOA when a mobile terminal is located is provided. As shown in FIG. 7, the apparatus includes a locating reference signal receiving module 102, a time domain related processing signal generation module 104, a variable threshold signal generation module 106, and a TOA searching module 108.

The locating reference signal receiving module 102 is configured to receive a locating reference signal sent by a locating transmitter.

In this embodiment, the apparatus for obtaining TOA when a mobile terminal is located is based on a locating receiver, and the locating transmitter is used by the locating receiver as a communications apparatus of a ranging mark. For example, if a mobile terminal MT actively measures a distance between the mobile terminal MT and a base station BS that is selected as a ranging mark, the mobile terminal MT is the locating receiver, and the base station BS that is selected as the ranging mark is the locating transmitter. If a base station BS actively measures a distance between the base station BS and a mobile terminal MT, the base station BS is the locating receiver, and the mobile terminal MT that is selected as a ranging mark is the locating transmitter.

The locating reference signal is a signal sent by the locating transmitter in a telecommunications network for a measuring or monitoring purpose. The mobile terminal MT and the base station BS store same synchronization reference signal sequences to keep synchronization. The mobile terminal MT or the base station BS may send the respective stored synchronization reference signal sequences to each other by using the locating reference signal.

For example, if the locating receiver is the mobile terminal MT, and the locating transmitter used as the ranging mark is the base station BS, the locating reference signal received by the mobile terminal MT may be a cell-specific reference signal (CRS) signal delivered by the base station. If the locating receiver is the base station BS, and the locating transmitter used as the ranging mark is the mobile terminal MT, the locating reference signal received by the mobile terminal MT may be a sounding reference signal (SRS) uploaded by the mobile terminal MT.

It should be noted that because a process of obtaining TOA by using the mobile terminal MT as the locating receiver and using the base station BS as the locating receiver is unrelated to a type of the locating reference signal, in subsequent embodiments, an example in which only the mobile terminal MT is used as the locating receiver to receive the CRS signal delivered by the base station BS, where the base station BS is used as the ranging mark and the CRS signal is used as the locating reference signal, is used for description. A case in which the base station BS is used as the locating receiver to receive the SRS signal uploaded by the mobile terminal MT, where the mobile terminal MT is used as the ranging mark and the SRS signal is used as the locating reference signal, is not described in detail.

The time domain related processing signal generation module 104 is configured to perform time domain related processing on the locating reference signal received by the locating reference signal receiving module 102 and a synchronization reference signal sequence to obtain a related spectrum value of a multipath signal component corresponding to a delay value.

Because there exists a distance difference between the locating receiver and the locating transmitter, there exists a delay effect when the locating reference signal is transmitted to the locating receiver. In addition, because the locating reference signal transmitted by the locating transmitter may undergo an effect such as reflection or diffraction in a transmission process, the locating reference signal may reach the locating receiver through multiple paths, and the locating reference signal received by the locating receiver has a multipath characteristic. By performing time domain related processing on the locating reference signal and the synchronization reference signal sequence on the locating receiver, and by calculating a correlation between the locating reference signal and the synchronization reference signal sequence on a time domain, related spectrum values corresponding to multipath signal components that are corresponding to different delay values in the locating reference signal may be determined.

For example, after the mobile terminal MT receives the CRS signal delivered by the base station BS that is used as the ranging mark, time domain related processing may be performed on the received CRS signal and a CRS sequence that is used as a synchronization reference signal sequence and that is on the mobile terminal MT, and distribution of a related spectrum value of a multipath signal component that changes with the delay value may be obtained. A schematic diagram of the distribution of the related spectrum value of the multipath signal component may be shown in FIG. 3. In FIG. 3, if a related spectrum value of a multipath signal component corresponding to a delay value is relatively large, it indicates that the multipath signal component reaches the locating receiver after the delay value elapses, that is, the locating reference signal transmitted by the locating transmitter selects a path to be transmitted to the locating receiver in the transmission process. A distance length of the path leads to a delay value corresponding to a power spectrum image in FIG. 3 when the locating reference signal transmitted by the path is transmitted to the locating receiver.

The variable threshold signal generation module 106 is configured to detect a channel parameter used when the locating reference signal is received, and generate, according to the channel parameter and a function that progressively decreases with the delay value, a related spectrum threshold that progressively decreases with the delay value.

In this embodiment, the related spectrum threshold is a value that changes with the delay value, but is not a constant value. When a channel environment is poor, noise interference is relatively strong. Therefore, in the related spectrum value that is of the multipath signal component corresponding to the delay value and that is obtained by the time domain related processing signal generation module 104, when the delay value is relatively small, a multipath signal component with a relatively large related spectrum value still exists. Therefore, the related spectrum threshold may be generated by using the function that progressively decreases with the delay value, and a parameter in the function that progressively decreases with the delay value is adjusted by using a channel parameter detected in real time, so as to filter out a noise vector used when the delay value is relatively small, thereby eliminating the noise interference.

In this embodiment, the channel parameter may include a signal-to-noise ratio SNR, a signal to interference plus noise ratio SINR, a channel environment parameter, or the like. The channel environment parameter may include a type such as additive white Gaussian noise (AWGN), ETU, or EPA. Optionally, for the function that progressively decreases with the delay value, an exponential function that uses the delay value as an independent variable and that progressively decreases with the delay value may be selected, and the variable threshold signal generation module 106 may be configured to: set, according to the signal-to-noise ratio SNR, a correction parameter value of the exponential function that progressively decreases with the delay value, and generate, according to the exponential function that progressively decreases with the delay value and whose correction parameter value is set, the related spectrum threshold that progressively decreases with the delay value.

As shown in FIG. 4, generating the related spectrum threshold by using the exponential function that progressively decreases with the delay value may reference an expression of an exponential function whose base is e:

$$\text{ThresholdValue}(t) = k e^{-b(t-t_{ref})} + c$$

where ThresholdValue(t) is the related spectrum threshold, and $t_{ref}$, k, b, and c are parameter values of the exponential function and may be set according to an actual situation. Because a characteristic that a decreasing rate of the exponential function gradually slows down, a relatively high related spectrum threshold may be set for strong noise used when the delay value is relatively small, and a decreasing speed of the related spectrum threshold is gradually slowed down when the delay value progressively increases. In this way, the generated related spectrum threshold may sharply decrease when the delay value is relatively small. The decreasing speed of the related spectrum threshold is gradually slowed down when the delay value is relatively small, the noise interference when the delay value is small may be filtered out, and a component of a locating reference signal that reaches through a shortest distance (that is, reaches through a first arrival path FAP) is prevented from being ignored because the related spectrum threshold is excessively high.

Optionally, the exponential function that progressively decreases with the delay value may be corrected according to the signal-to-noise ratio SNR. Specifically, as shown in FIG. 5, the variable threshold signal generation module 106 is further configured to: obtain a preset SNR threshold range; search for an SNR threshold range to which the detected signal-to-noise ratio SNR belongs; and obtain a correction parameter value corresponding to the found SNR threshold range, and set the correction parameter value corresponding to the found SNR threshold range to the correction parameter value of the exponential function that progressively decreases with the delay value.

The signal-to-noise ratio SNR reflects a noise interference degree of a current channel when the locating reference signal is received. When the signal-to-noise ratio SNR is relatively high, the related spectrum threshold when the delay value is relatively small may be decreased by setting a parameter of the exponential function that progressively decreases with the delay value, thereby preventing a signal component of the locating reference signal that reaches the locating receiver through the first arrival path FAP from being ignored because the related spectrum threshold is excessively high. When the signal-to-noise ratio SNR is relatively low, the related spectrum threshold when the delay value is relatively small may be increased by setting the parameter of the exponential function that progressively decreases with the delay value, thereby preventing noise from being incorrectly determined as the signal component of the locating reference signal that reaches the locating receiver through the first arrival path FAP, and further improving accuracy of obtaining TOA.

Specifically, in this embodiment, the variable threshold signal generation module 106 may be further configured to: according to a formula:

$$\text{ThresholdValue}(t) = S_1(\text{SNR}) a N_0 e^{-b(t-t_{ref})} + S_2(\text{SNR})$$

$$P(Z_n \geq aN_0) = \delta$$

generate the related spectrum threshold Threshold(t) that progressively decreases with the delay value, where a variable t is the delay value, $t_{ref}$ is a reference delay, $S_1(\text{SNR})$ is a first correction parameter value corresponding to the SNR threshold range to which the detected signal-to-noise ratio SNR belongs, $S_2(\text{SNR})$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal, $P(Z_n \geq aN_0)$ is a probability that the signal strength of the received locating reference signal is greater than or equal to $aN_0$ when the delay value is t, $\delta$ is a probability threshold (which may be preferably $1 \times 10^{-9}$), and a is a solution of $P(Z_n \geq aN_0) = \delta$.

Optionally, the adjustment coefficient b may be a preset parameter value corresponding to the channel environment parameter. As described above, the channel environment parameter may include the type such as the AWGN, the ETU, or the EPA, and the corresponding adjustment coefficient b may be set according to the channel environment parameter, so that the obtained related spectrum threshold may adapt to multiple channel environments, and ranging accuracy is improved.

The TOA searching module 108 is configured to: receive the related spectrum value that is corresponding to the delay value and that is generated by the time domain related processing signal generation module and the related spectrum threshold that is corresponding to the delay value and that is generated by the variable threshold signal generation module, traverse the delay value in ascending order of the delay value, search for a first traversed delay value whose related spectrum value of a multipath signal component corresponding to the delay value is greater than a related spectrum threshold corresponding to the delay value, and use the found delay value as TOA for outputting.

As shown in FIG. 4, after the related spectrum value of the multipath signal component that distributes according to the delay value and the related spectrum threshold that progressively decreases with the delay value are obtained, traversing may be performed when the delay value progressively increases. The related spectrum value of the multipath signal component corresponding to the traversed delay value is compared with the related spectrum threshold corresponding to the traversed delay value. If at a moment, the related spectrum value of the multipath signal component is greater than the related spectrum threshold at first determining, a delay value corresponding to the moment is the delay value when the locating reference signal reaches the locating receiver through the first arrival path FAP. Because a straight line between two points is shortest, the signal component of the locating reference signal that reaches the locating receiver through the first arrival path FAP is a signal component for transmitting the locating reference signal from the locating transmitter to the locating receiver through a straight line, and the delay value is TOA of the locating reference signal.

It should be noted that the time domain related processing signal generation module 104 and the variable threshold signal generation module 106 need to be executed at the same time. That is, at the same time of gradually obtaining the related spectrum value of the multipath signal component by means of time domain related processing when the delay value increases, the related spectrum threshold at the moment is also obtained by means of calculation by using the function that progressively decreases with the delay value. By inputting the related spectrum value of the multipath signal component and the related spectrum threshold at the moment into a comparison circuit, the first traversed delay value whose related spectrum value of the multipath signal component corresponding to the delay value is greater than the related spectrum threshold corresponding to the delay value may be searched for.

For example, the time domain related processing signal generation module 104 may obtain, based on a chip or a processor including a time domain related processing function, a first signal of the related spectrum value of the multipath signal component that changes when the delay value increases. In addition, the variable threshold signal generation module 106 may obtain, based on a chip or a processor including a function calculation function (which may be a same processor as the chip or the processor including the time domain related processing function), a second signal of the related spectrum threshold that changes when the delay value increases. The TOA searching module 108 may sample and detect the first signal and the second signal. A sampling time point is the traversed delay value. If at a sampling time point, the detected first signal is greater than or equal to the second signal, a delay value at the sampling time point is the found first traversed delay value whose related spectrum value of the multipath signal component corresponding to the delay value is greater than the related spectrum threshold corresponding to the delay value.

An actual application scenario is used as an example. If in the application scenario, the detected channel environment parameter is the ETU type, the adjustment parameter b may be set according to the ETU type. If the preset SNR threshold range includes three intervals that are successively $(-\infty, -4]$, $(-4, 4)$, and $[4, \infty)$, and the first correction parameter value and the second correction parameter value corresponding to each SNR threshold range are successively 3 and 4 (corresponding to the SNR threshold range $(-\infty, -4]$), 2 and 2 (corresponding to the SNR threshold range $(-4, 4]$), and 2 and 0 (corresponding to the SNR threshold range $[4, \infty)$), a function for generating the related spectrum threshold may be:

$$\text{ThresholdValue}(t) = \begin{cases} 3aN_0 e^{-b(t-t_{ref})} + 4, & SNR \geq 4 \\ 2aN_0 e^{-b(t-t_{ref})} + 2, & SNR \in (-4, 4) \\ 2aN_0 e^{-b(t-t_{ref})}, & SNR \leq -4 \end{cases}$$

If at a moment, the detected signal-to-noise ratio SNR is $-2$, an SNR threshold range corresponding to SNR=$-2$ is $(-4, 4)$, a corresponding first correction parameter value is 2, and a second correction parameter value is 2. In the end, the function for generating the related spectrum threshold in the signal-to-noise ratio environment is:

$$ThresholdValue(t)=2aN_0 e^{-b(t-t_{ref})}+2,$$

where $t_{ref}$ may be set to 1 Ts, b may be set to 0.001, and a finally obtained related spectrum threshold that progressively decreases with the delay value is:

$$ThresholdValue(t)=2aN_0 e^{-0.001(t-t_{ref})}+2.$$

A schematic diagram of distribution of the related spectrum value of the multipath signal component in the application scenario is shown in FIG. 6. A delay t=44 Ts, where the delay is corresponding to the signal component of the locating reference signal that reaches through the first arrival path FAP, and 44 Ts may be used as the TOA for outputting.

Optionally, when the found delay value is used as the TOA for outputting, it may be determined, according to a channel parameter of the current channel, whether the found delay value is suitable for being used as the TOA for outputting. Specifically, the TOA searching module 108 may be further configured to determine whether the SNR or the SINR is greater than or equal to a preset channel indicator threshold. If the SNR or the SINR is greater than or equal to the preset channel indicator threshold, it indicates that the channel environment is good, and the found delay value is suitable for being used as the TOA for outputting. In this case, the delay value that is used as the TOA for outputting may be used as a historical premium delay value to be cached. If the SNR or the SINR is less than the preset channel indicator threshold, it indicates that the found delay value is obtained when the channel environment is relatively poor. Though a relatively proper related spectrum threshold is selected in the foregoing manner, a probability of incorrect determining still exists. In this case, the TOA searching module 108 may be configured to: generate a weight coefficient according to the detected SNR or SINR, obtain the cached historical premium delay value, perform weighted averaging on the historical premium delay value and the found delay value according to the weight coefficient to obtain a correction delay value, and use the correction delay value as the TOA.

This is reflected in a formula:

$$\begin{cases} TOA_1 = t_1, & SNR \geq c \\ TOA_2 = \alpha(SNR) \cdot t_1 + (1-\alpha) \cdot t_2, & \alpha(SNR) \in [0,1], SNR < c \end{cases}.$$

For example, if a user who uses the mobile terminal MT inputs an instruction for starting ranging, the mobile terminal MT starts to be used as the locating receiver to receive the CRS signal delivered by the base station BS that is used as the ranging mark. If a found delay value obtained when step S102 to step S108 are performed for the first time is $t_1$, and it is detected, in a process of searching for and obtaining $t_1$, that the SNR is greater than the channel indicator threshold c, it indicates that noise interference to this ranging is relatively weak, and $t_1$ may be used as the TOA for outputting. If the user re-inputs the instruction for starting ranging, the mobile terminal MT is used as the locating receiver to receive the CRS signal delivered by the base station BS that is used as the ranging mark, a found delay value obtained by performing step S102 to step S108 is $t_2$, and the detected SNR decreases to below the channel indicator threshold c because strong interference occurs in an area in which the mobile terminal MT is located, $t_2$ is not used as the TOA for outputting. Instead, a weight coefficient α is generated according to the detected SNR, $t_1$ that is used as the historical premium delay value needs to be considered as a reference, $t_1$ is multiplied by the weight coefficient α, $t_2$ is multiplied by a weight coefficient 1−α, and then addition is performed. A delay value obtained by means of addition calculation is used as the TOA for outputting.

TOA outputted in this manner references TOA previously outputted when the SNR is relatively high, an error of a delay value obtained in an environment in which the SNR is relatively low may be reduced, and the ranging accuracy is improved.

Further, after the user inputs the instruction for starting ranging into the mobile terminal MT, the mobile terminal MT may repeatedly perform step S102 to step S108 for multiple times (such as 100 times), set, according to an SNR detected at each execution, a weight coefficient of a delay value obtained at each searching, perform weighted averaging according to the delay value and the corresponding weight coefficient obtained at each searching, and use an average value as the TOA for outputting. TOA generated in this manner is obtained through multiple times of measurement, an error generated at each measurement may be reduced by calculating the average value, and the ranging accuracy is improved.

For example, a former application scenario is further used as an example. In the application scenario, if at a moment, the detected signal-to-noise ratio SNR is −6, an SNR threshold range corresponding to SNR=−6 is (−∞, −4), a corresponding first correction parameter value is 2, and a second correction parameter value is 0. In the end, the function for generating the related spectrum threshold in the signal-to-noise ratio environment is:

$$ThresholdValue(t)=2aN_0 e^{-0.001(t-5t_{ref})},$$

where $t_{ref}$ may be set to 1 Ts. A schematic diagram of distribution of the related spectrum value of the multipath signal component in the application scenario is shown in FIG. 6. A delay t=41 Ts, where the delay is corresponding to the signal component of the locating reference signal that reaches through the first arrival path FAP.

If the signal indicator threshold c is −4, because SNR<c, a weight coefficient a needs to be generated according to the SNR.

In the application scenario, the weight coefficient a may be set according to the following formula:

$$\alpha(SNR) = \begin{cases} 0, & SNR \geq 3 \\ -\frac{1}{13} \cdot SNR + \frac{3}{13}, & SNR \in (-10, 3) \\ 1, & SNR \leq -10 \end{cases}.$$

Therefore, α(−6) is obtained by means of calculation and is 9/13. Because in previous measurement, the SNR is −2 and is greater than the signal indicator threshold c, the delay value 44 Ts that is used as the TOA for outputting is the historical premium delay value.

According to a formula:

$$\frac{9}{13} \cdot 44 + \left(1 - \frac{9}{13}\right) \cdot 41 = \frac{560}{13} \approx 43 Ts,$$

TOA outputted in this measurement is 43 Ts.

Figure 8:
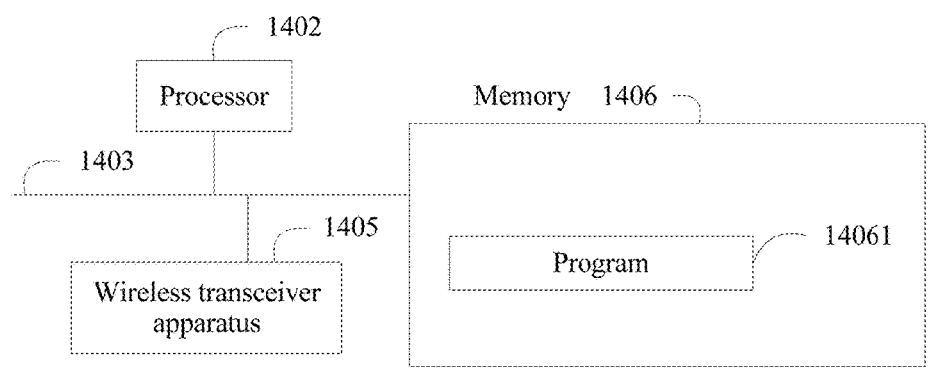
FIG. 8 is a schematic structural diagram of a device for measuring time of arrival TOA according to an embodiment of the present invention.

FIG. 8 describes a structure of a device for measuring time of arrival TOA according to another embodiment of the present invention, including at least one processor 1402 (such as a CPU), at least one wireless transceiver apparatus (such as an antenna) 1405 or other communications interface, a memory 1406, and at least one communications bus 1403 that is configured to implement connection and communication between these apparatuses. The processor 1402 is configured to execute an executable module, such as a computer program, stored in the memory 1406. The memory 1406 may include a high-speed random access memory (RAM: Random Access Memory), and may further include a non-volatile memory (non-volatile memory), such as at least one magnetic disk memory.

In some implementations, the memory 1406 stores a program 14061, and the program 14061 may be executed by the processor 1402. This program includes:

receiving a locating reference signal sent by a locating transmitter;

performing time domain related processing on the locating reference signal and a synchronization reference signal sequence to obtain a related spectrum value of a multipath signal component corresponding to a delay value;

detecting a channel parameter used when the locating reference signal is received, and generating, according to the channel parameter and a function that progressively decreases with the delay value, a related spectrum threshold that progressively decreases with the delay value; and traversing the delay value in ascending order of the delay value, searching for a first traversed delay value whose related spectrum value of a multipath signal component corresponding to the delay value is greater than a related spectrum threshold corresponding to the delay value, and using the found delay value as TOA for outputting.

In conclusion, implementation of the embodiments of the present invention brings the following beneficial effects:

According to the method and the apparatus for obtaining TOA when a mobile terminal is located, related spectrum values of multiple multipath signal components corresponding to delay values are obtained by performing time domain related processing on a locating reference signal and a synchronization reference signal sequence, a related spectrum threshold that progressively decreases with the delay value is generated according to a channel parameter used when the locating reference signal is received and by using a function that progressively decreases with the delay value, and time of arrival TOA is generated for outputting by comparing the related spectrum value of the multipath signal component and the related spectrum threshold. Compared with a manner of using an energy spectrum value in a conventional technology, for the related spectrum value obtained by means of time domain related processing, a gain is larger. Therefore, a difference between a multipath signal and noise is relatively big, and an error generated when the related spectrum value of the multipath signal component is compared with the related spectrum threshold is relatively minor. In addition, the related spectrum threshold that progressively decreases with the delay value and that is generated according to the channel parameter and by using the function that progressively decreases with the delay value enables a related spectrum threshold corresponding to a relatively small delay value to be relatively large when an SNR is relatively small, so that impact generated by partial noise is filtered out. Therefore, the method and the apparatus for obtaining TOA when a mobile terminal is located can adapt to an environment in which the SNR is relatively small, so that ranging accuracy is improved.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A method for obtaining time of arrival (TOA) when a mobile terminal is located, the method comprising:

receiving a locating reference signal sent by a locating transmitter;

performing time domain related processing on the locating reference signal and a synchronization reference signal sequence to obtain a related spectrum value of a multipath signal component corresponding to a delay value;

detecting a channel parameter used when the locating reference signal is received, and generating, according to the channel parameter and a function that progressively decreases with the delay value, a related spectrum threshold that progressively decreases with the delay value; and traversing the delay value in ascending order of the delay value, searching for a first traversed delay value whose related spectrum value of a multipath signal component corresponding to the delay value is greater than the related spectrum threshold corresponding to the delay value, and using the found delay value as TOA for outputting.

2. The method for obtaining TOA when a mobile terminal is located according to claim 1, wherein the channel parameter comprises a signal-to-noise ratio (SNR); and the generating, according to the channel parameter and a function that progressively decreases with the delay value, the related spectrum threshold that progressively decreases with the delay value comprises:

setting, according to the signal-to-noise ratio SNR, a correction parameter value of an exponential function that progressively decreases with the delay value, and generating, according to the exponential function that progressively decreases with the delay value and whose correction parameter value is set, the related spectrum threshold that progressively decreases with the delay value.

3. The method for obtaining TOA when a mobile terminal is located according to claim 2, wherein the setting, according to the signal-to-noise ratio SNR, a correction parameter value of an exponential function that progressively decreases with the delay value comprises:

obtaining a preset SNR threshold range;

searching for an SNR threshold range to which the detected signal-to-noise ratio SNR belongs; and obtaining a correction parameter value corresponding to the found SNR threshold range, and setting the correction parameter value corresponding to the found SNR threshold range to the correction parameter value of the exponential function that progressively decreases with the delay value.

4. The method for obtaining TOA when a mobile terminal is located according to claim 3, wherein the generating, according to the exponential function that progressively decreases with the delay value and whose correction parameter value is set, the related spectrum threshold that progressively decreases with the delay value is:

according to a formula:

$$\text{ThresholdValue}(t) = S_1(\text{SNR})aN_0 e^{-b(t-t_{ref})} + S_2(\text{SNR})$$

$$P(Z_n \geq aN_0) = \delta$$

generating the related spectrum threshold ThresholdValue (t) that progressively decreases with the delay value, wherein a variable t is the delay value, $t_{ref}$ is a reference delay, $S_1(SNR)$ is a first correction parameter value corresponding to the SNR threshold range to which the detected signal-to-noise ratio SNR belongs, $S_2(SNR)$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal $P(Z_n \geq aN_0)$ is a probability that the signal strength of the received locating reference signal is greater than or equal to $aN_0$ when the delay value is t, δ is a probability threshold, and a is a solution of $P(Z_n \geq aN_0)=δ$.

5. The method for obtaining TOA when a mobile terminal is located according to claim 1, wherein the channel parameter comprises the signal-to-noise ratio SNR or a signal to interference plus noise ratio SINR; and the using the found delay value as TOA comprises:

when the SNR or the SINR is greater than or equal to a preset channel indicator threshold, caching the found delay value to be used as a historical premium delay value, and using the found delay value as the TOA.

6. The method for obtaining TOA when a mobile terminal is located according to claim 5, wherein the using the found delay value as TOA comprises:

when the SNR or the SINR is less than the preset channel indicator threshold, generating a weight coefficient according to the detected SNR or SINR; and obtaining the cached historical premium delay value, performing weighted averaging on the historical premium delay value and the found delay value according to the weight coefficient to obtain a correction delay value, and using the correction delay value as the TOA.

7. An apparatus for obtaining time of arrival (TOA), comprising:

a memory to store instructions; and a processor in communication with the memory to execute the instructions to configure the apparatus to:

receive a locating reference signal sent by a locating transmitter;

perform time domain related processing on the locating reference signal and a synchronization reference signal sequence to obtain a related spectrum value of a multipath signal component corresponding to a delay value;

detect a channel parameter used when the locating reference signal is received, and generate, according to the channel parameter and a function that progressively decreases with the delay value, a related spectrum threshold that progressively decreases with the delay value; and receive the related spectrum value that is corresponding to the delay value and that is generated by the time domain related processing signal generation module and the related spectrum threshold that is corresponding to the delay value and that is generated by the apparatus, traverse the delay value in ascending order of the delay value, search for a first traversed delay value whose related spectrum value of a multipath signal component corresponding to the delay value is greater than the related spectrum threshold corresponding to the delay value, and use the found delay value as TOA for outputting.

8. The apparatus for obtaining TOA according to claim 7, wherein the channel parameter comprises a signal-to-noise ratio SNR; and the apparatus is further configured to: set, according to the signal-to-noise ratio (SNR), a correction parameter value of an exponential function that progressively decreases with the delay value, and generate, according to the exponential function that progressively decreases with the delay value and whose correction parameter value is set, the related spectrum threshold that progressively decreases with the delay value.

9. The apparatus for obtaining TOA according to claim 7, wherein the apparatus is further configured to: obtain a preset SNR threshold range; search for an SNR threshold range to which the detected signal-to-noise ratio SNR belongs; and obtain a correction parameter value corresponding to the found SNR threshold range, and set the correction parameter value corresponding to the found SNR threshold range to the correction parameter value of the exponential function that progressively decreases with the delay value.

10. The apparatus for obtaining TOA according to claim 9, wherein the apparatus is further configured to: according to a formula:

$$\text{ThresholdValue}(t)=S_1(SNR)aN_0 e^{-b(t-t_{ref})}+S_2(SNR)$$

$$P(Z_n \geq aN_0)=δ$$

generate the related spectrum threshold ThresholdValue(t) that progressively decreases with the delay value, wherein a variable t is the delay value, $t_{ref}$ is a reference delay, $S_1(SNR)$ is a first correction parameter value corresponding to the SNR threshold range to which the detected signal-to-noise ratio SNR belongs, $S_2(SNR)$ is a second correction parameter value corresponding to the SNR threshold range to which the detected signal-to-noise ratio SNR belongs, b is an adjustment coefficient ranging from 0 to 1, $N_0$ is a noise constant, $Z_n$ is signal strength of the received locating reference signal, $P(Z_n \geq aN_0)$ is a probability that the signal strength of the received locating reference signal is greater than or equal to $aN_0$ when the delay value is t, δ is a probability threshold, and a is a solution of $P(Z_n \geq aN_0)=δ$.

11. The apparatus for obtaining TOA according to claim 7, wherein the channel parameter comprises the signal-to-noise ratio SNR or a signal to interference plus noise ratio SINR; and the apparatus is configured to: when the SNR or the SINR is greater than or equal to a preset channel indicator threshold, cache the found delay value to be used as a historical premium delay value, and use the found delay value as the TOA.

12. The apparatus for obtaining TOA according to claim 11, wherein the apparatus is configured to: when the SNR or the SINR is less than the preset channel indicator threshold, generate a weight coefficient according to the detected SNR or SINR; and obtain the cached historical premium delay value, perform weighted averaging on the historical premium delay value and the found delay value according to the weight coefficient to obtain a correction delay value, and use the correction delay value as the TOA.

13. A device for measuring time of arrival (TOA), comprising:

a memory to store programs; and a processor configured to invoke the programs stored in the memory to perform the following operations:

receiving a locating reference signal sent by a locating transmitter;

performing time domain related processing on the locating reference signal and a synchronization reference signal sequence to obtain a related spectrum value of a multipath signal component corresponding to a delay value;

detecting a channel parameter used when the locating reference signal is received, and generating, according to the channel parameter and a function that progressively decreases with the delay value, a related spectrum threshold that progressively decreases with the delay value; and traversing the delay value in ascending order of the delay value, searching for a first traversed delay value whose related spectrum value of a multipath signal component corresponding to the delay value is greater than the related spectrum threshold corresponding to the delay value, and using the found delay value as TOA for outputting.

* * * * *